Aug. 15, 1967 L. MOORE 3,336,483
TIME DELAY CIRCUIT AND METHOD
Filed Dec. 17, 1962

INVENTOR.
LAURENCE MOORE
BY
ATTORNEY

United States Patent Office 3,336,483
Patented Aug. 15, 1967

3,336,483

TIME DELAY CIRCUIT AND METHOD

Laurence Moore, Menlo Park, Calif., assignor to Moore Associates, Inc., San Carlos, Calif., a corporation of California Filed Dec. 17, 1962, Ser. No. 245,237
9 Claims. (Cl. 307—88.5)

Figure 1:
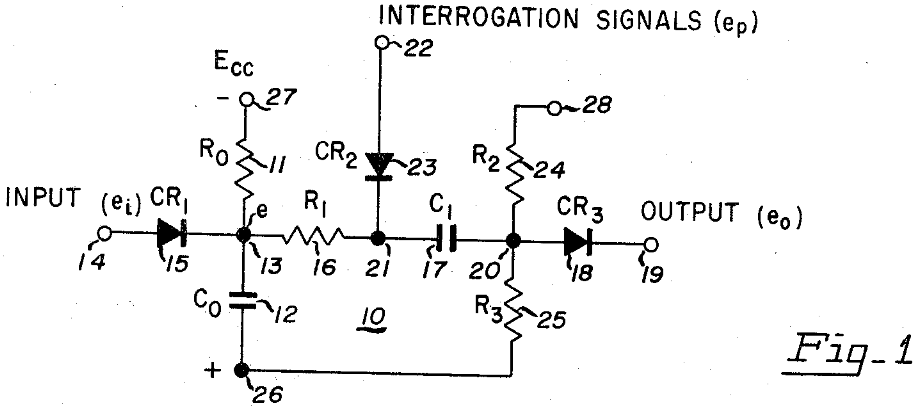

This invention relates to time delay circuits and a method therefor, and more particularly to a circuit and method for providing time delays of long duration.

In many electronic systems it has been found necessary to provide a definite time relationship between two events by which one event is delayed a definite time interval with respect to another event. The events involved are generally marked by short pulses or signals so that the problem of generating time delays commonly comprises the utilization of the signal marking the first event to initiate the signal marking the second event a definite time interval later.

One well known method of producing such time delays comprises the utilization of conventional monostable multivibrators in which the active circuit elements are so interconnected by an R–C circuit that the time constant of an R–C circuit provides the proper delay. Monostable multivibrators have been found eminently useful, particularly when the time delays are relatively short, say less than $\frac{1}{10}$ of a second. For longer delays, however, monostable multivibrators become expensive and physically large and are not always accurate.

Since monostable multivibrators include resistive capacitive impedance coupling between two active elements whose time constant determines the delay, the size of this impedance becomes quite large as the delay increases. Further, in case of large delays, the leakage current of the transistors becomes a problem requiring compensating circuitry thereby introducing further complexity.

Generally speaking, monostable multivibrators utilizing germanium transistors require a very large capacitor in case the germanium transistors form part of the timing circuit. In case of use of monostable multivibrators having very high impedance circuits, very low leakage silicon transistors would be needed to provide the active elements.

Another means for generating time delays employed heretofore is to utilize a comparator in connection with a Miller integrator in which the saw-tooth wave of a saw-tooth wave generator backbiases a diode. The delay is proportional to the time taken by the saw-tooth wave to decrease its amplitude to a value permitting the flow of current through the diode. This type of delay means is likewise much more suitable for very short delays because the smaller the period, the smaller and less complex is the saw-tooth wave generator.

For delaying theh time between two events from below one-tenth of a second to above several minutes, none of the prior art time delay circuits has been found entirely satisfactory from a point of view of small physical size, simplicity and economy.

It is therefore a primary object of this invention to provide a time delay circuit and method therefor particularly useful in delaying one event with respect to another event from below one-tenth of a second to several minutes.

It is another object of this invention to provide a time delay circuit utilizing only low impedance active circuits and high impedance integrating circuits.

It is a further object of this invention to provide a time delay circuit utilizing as the only active circuit coupling components a pair of silicon diodes whose leakage is of negligible effect.

It is a further object of this invention to provide a new and improved time delay circuit particularly suitable for long time delays which are smaller in size, less complex and more economical than time delay circuits known heretofore.

It is also an object of this invention to provide a time delay circuit which is continually interrogated with short pulses which are blocked until the expiration of the desired time delay after the first event and which are thereafter passed to a suitable utilization means to initiate the second event.

It is also an object of this invention to provide a time delay which may be utilized with other similar time delays each of which is controllable separately but all of which are interrogated with the same interrogation signal.

Figure 2:
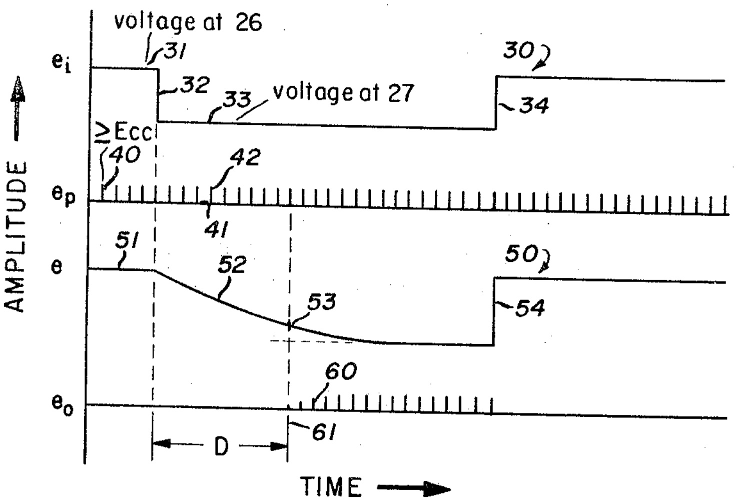

Other objects and a better understanding of the invention may be had by reference to the following description, taken in conjunction with the accompanying drawings, in which:

FIG. 1 is a schematic circuit diagram of the time delay circuit of this invention; and FIG. 2 is a graph showing the variations with time of the voltages at various identified points in the circuit of FIG. 1.

Referring now to the drawings, there is shown a time delay circuit 10 constructed in accordance with this invention. Circuit 10 includes an R–C time constant network comprising a resistive impedance $R_0$ indicated at 11 and a capacitive impedance $C_0$ indicated at 12, serially connected to one another at circuit point 13. Circuit point 13 is also connected to an input terminal 14 through a silicon diode $CR_1$ indicated 15. Biasing voltages are applied across the R–C time constant network as indicated by biasing terminals 26 and 27. In the embodiment here illustrated 27 is maintained at a negative potential $-E_{cc}$ with respect to 26.

Circuit point 13 is also connected, through a resistive impedance $R_1$ indicated at 16, a capacitive impedance $C_1$ indicated at 17, and a silicon diode $CR_3$ indicated at 18, to an output terminal 19. The junction between resistive impedance 16 and capacitive impedance 17 defines a circuit point 21 and the junction between capacitive impedance 17 and diode 18 defines a circuit point 20. Circuit point 21 is connected to an interrogation signal terminal 22 through a silicon diode $CR_2$ indicated at 23.

Circuit point 20 is connected to biasing terminal 26 through a resistive impedance $R_3$ indicated at 25 and to a biasing terminal 28 through a resistive impedance $R_2$ indicated at 24. Even though circuit point 20 is shown connected to biasing terminal 26 it may, for certain applications, be desirable to disconnect the same and apply instead a different bias thereto.

Referring now to the operation of the time delay circuit 10, bias terminal 27 is connected to a biasing source to maintain the same at voltage $-E_{cc}$ with respect to terminal 26. An input or control signal $e_i$ is applied to input terminal 14 and may have the form of curve 30, FIG. 2. Input signal $e_i$ has a portion 31 which is sufficiently positive with respect to biasing source $-E_{cc}$ forward bias diode 15 and to maintain a current flow therethrough and through resistor 11.

Since the voltage drop across diode 15, when the same is forward biased, is very small, the voltage at circuit junction 13 is substantially the same as the potential of portion 31 of the applied input signal $e_i$. This is shown in graph 50 by the portion indicated at 51. It is also immediately seen, that while current flows through resistor 11, capactive impedance 12 is charged to substantially the same voltage as circuit point 13. During this time diode 23 is maintained in a non-conductive state so that circuit point 21 will be at substantially the same potential as circuit point 13 and no current flows through resistor 16.

Applied to input terminal 22 is an interrogation input signal $e_p$ which may be of the form of short, low impedance, equidistant pulses as shown at 40, having a pulse repetition rate consistent with the resolution required, as will be presently explained. The potential level of the interrogation signal is carefully selected so that the base voltage 41 is equal to or more negative than $-E_{cc}$ and the interrogation pulse 42 is more positive than $-E_{cc}$ but less than the voltage of circuit point $e$ as indicated at 51. If pulse height 42 is selected to be 0.37 $-E_{cc}$ so that the maximum amplitude of $e_p$ is $-.63\ E_{cc}$, diode 23 remains back-biased until the voltage at circuit point 13 falls below $-.37\ E_{cc}$.

Time delay circuit 10 is triggered by the negative going edge 32 of input voltage $e_1$ which back-biases diode 15 provides it drops the voltage level $e_1$ below $-E_{cc}$ as shown at 33. This causes diode 15 to become non-conductive and effectively isolates the R–C time constant circuit which will then discharge, through resistor 11 and into terminal 27, in the customary manner as shown by discharging curve portion 52, FIG. 2. As soon as the voltage at circuit point 13 decays to a value equal to that of the interrogation signal 40, diode 23 will become forward biased and conductive. This is shown by point 53 at which the voltage circuit point 21 drops below the amplitude of the applied interrogation signal 40, so that the interrogation pulses 42 forward bias diode 23 during the duration of an interrogation pulse. This current flow generates a signal which is coupled, through coupling capacitor 17 and isolation diode 18, to output terminal 19. This is shown at 60, FIG. 2. Pulses 60 are available at output terminal 19 and may now be applied to some active circuit which is triggered by the first pulse. A suitable utilization device may be a monostable multivibrator which is continually triggered by interrogation pulses 60 applied to output terminal 19.

The delay provided by circuit 10 is best illustrated by reference to FIG. 2 and is indicated by reference character D which is the distance starting at negative going pulse edge 32 initiating the delay and ending with the first pulse of the group of pulses 60 becoming available at output terminal 19. As soon as input voltage $e_1$ goes positive, as shown at 34, the voltage at circuit point 13 will immediately rise, as shown at 54, to forward bias diode 15 which raises the potential of circuit point 21 and back-biases diode 23 thereby blocking the passage of any further pulses, such as 60.

The delay D provided by circuit 10 of this invention depends on the time constants of the R–C network including capacitive impedance 12 and resistive impedance 11 and on the ampitude of interrogation pulses 42.

The greater the discharge time, the longer will be the time necessary to bring circuit point 21 to a sufficiently low potential so that interrogation pulses forward bias diode 23. Also the greater the maximum amplitude of the interrogation pulses, the shorter will be the delay since the potential at circuit point 21 need not drop as much as for small amplitude interrogation pulses.

If the interrogation pulses 42 are widely spaced the exact point 53 at which an interrogation pulse may forward bias diode 23 sufficiently for current to flow may be somewhat uncertain. If great resolution is desired, interrogation pulses 40 should be very closely spaced in comparison with the time constant $R_0C_0$. Furthermore, $C_1$ is selected to be very much smaller than $C_0$ so that for all practical purposes its impedance may be neglected in calculating the time constant of the circuit.

For a typical application of circuit 10, the following circuit components may be utilized in the construction of a time delay for providing a one second delay. To this end the R–C constant time delay network may be constructed to have a time constant $R_0C_0$ equal to one second, a result provided by selecting resistance $R_0$ to be 1 megohm and capacitance to be 1 microfarad. In this manner, capacitive impedance 12 will discharge in one second to .37 of its original charge. If the amplitude of the interrogation pulses is selected to be .37 of the difference between $-E_{cc}$ and the maximum potential applied to point 13, then after one second, point 53 is reached.

Further, the spacing of the interrogation pulses will determine the resolution since the spacing determines how close a pulse is to point 53 when diode 23 is just on the point of being forward biased. For good resolution any pulse rate above 100 interrogation pulses per second might be utilized which means that even in the worst case, the error will be less than one-half percent.

For the circuit described above $R_1$ may be 100,000 ohms, $C_1$ may be .0022 microfarad, $R_2$ may be 47,000 ohms and $R_3$ may be 4,700 ohms.

There has been described hereinabove a time delay circuit in which interrogation pulses are applied to a diode which is maintained back-biased by an R–C time constant network. The delay is initiated by isolating the R–C network and permitting the same to discharge and thereby lower the back-bias until the decaying voltage is insufficient to maintain the back-bias. Thereafter, interrogation pulses are passed to initiate a second event.

What is claimed is:

1. A method for providing a selected time delay between the occurrence of a first signal and the commencement of a pulse train of interrogation pulses, said method comprising the steps of:
   - selecting the pulse train to have a period which is at lease an order of magnitude smaller than said selected time delay;
   - applying the pulse train to a unidirectional current conducting means which becomes nonconducting when back-biases;
   - back-biasing said current conducting means with an R-C time constant circuit normally charged to a first potential which is greater than twice the potential of the interrogation pulses and which is dischargeable to a second potential which is smaller than the potential of the interrogation pulses and which therefore forward-biases said current conducting means;
   - selecting the time constant of said R-C time constant circuit such that it discharges from said first potential to the potential of the interrogation pulses during said selected time delay; and
   - initiating the discharge of said R-C circuit with the first signal.

2. A method for providing a selected time delay between the occurrence of a first signal and the commencement of a pulse train of interrogation pulses, said method comprising the steps of:
   - selecting the pulse train to have a period which is at least an order of magnitude smaller than said selected time delay;
   - applying the pulse train to a unidirectional current conducting means which becomes nonconducting when back-biased;
   - back-biasing said current conducting means with an R-C time constant circuit normally fully discharged at a first potential which is smaller than twice the potential of the interrogation pulses and which is chargeable to a second potential which is higher than the potential of the interrogation pulses and which therefore forward-biases said current conducting means;
   - selecting the time constant of said R-C time constant circuit such that it charges from said first potential to the potential of the interrogation pulses during said selected time delay; and
   - initiating the charging of said R-C time constant circuit with the first signal.

3. A method for providing a selected time delay between two events, the first event being the application of an initiating signal and the second event being the occurrence of a delayed signal, said method comprising the steps of:
   - generating a train of closely spaced pulses having a period which is at least an order of magnitude smaller than said selected time delay;

controlling the conduction of said train of pulses with the potential of an R-C time constant circuit which is normally maintained at a first potential to block the conduction and which is either chargeable or dischargeable in accordance with its time constant to a second potential to allow the conduction of said train of pulses;

selecting the time constant of said R-C time constant circuit and the amplitude of the pulses in said train of pulses such that the R-C time constant circuit either charges or discharges to a potential commensurate with the amplitude of the pulses of said train of pulses during said selected time delay; and initiating charging or discharging said R-C time constant circuit by application of the initiating sgnal, the delayed signal being the first conducted pulse from said train of pulses.

4. A method for providing a selected time delay between two events, the first event being the application of an initiating signal and the second event being the occurrence of a delay signal, said method comprising the steps of:

generating a train of closely spaced pulses having a period which is at least an order of magnitude smaller than said selected time delay;

controlling the condution of said train of pulses with the potential of an R-C time constant circuit which is normally maintained at a first potential to block the conduction and which is either chargeable or dischargeable in accordance with its time constant to a second potential to allow the conduction of said train of pulses, the amplitude of the pulses in said train of pulses being less than one-half of the difference between said first and second potential;

selecting the time constant of said R-C time constant circuit and the amplitude of the pulses in said train of pulses such that the R-C time constant circuit either charges or dischargres to a potential commensurate with the amplitude of the pulses of said train of pulses during said selected time delay; and initiating charging or discharging of said R-C time constant circuit by application of the initiating signal, the delayed signal being the first conducted pulse from said train of pulses.

5. A time delay circuit for providing a delayed signal a selected time interval after the occurrence of a control signal comprising:

R-C time constant network means;

charging means for normally charging said network means to a first potential, said charging means being operative to effectively disconnect itself from said network means upon the occurrence of the control signal to permit said network means to discharge to a second potential;

a source of applied signal pulses;

an impedance means connected to said network means, said impedance means having a resistance in excess of 10 ohms; and diode means connected between said source of signal pulses and said impedance means, said network means back-biasing said diode means when charged to said first potential to block conduction of said signal pulses therethrough and forward biasing said diode means when discharged to said second potential to conduct said signal pulses therethrough as said delayed signal, said selected time interval being the time necessary to discharge said network means to a point where the potential is equal to that of the amplitude of said signal pulses.

6. A time delay circuit comprising:

a R-C time constant circuit including a capacitive and a resistive impedance in series and connected to one another at a circuit point;

first diode means coupled to said circuit point to charge said R-C circuit;

control means coupled to said first diode means to isolate said R-C circuit from said first diode means in response to a control signal for commencing discharging of said R-C circuit in accordance with its time constant;

a source of periodic pulses;

a second diode means having applied thereto said periodic pulses;

a resistive impedance connected between said circuit point and said second diode means, said impedance having a resistance in excess of 10 ohms; and output circuit means connected to the junction of said second diode means and said resistive impedance for reception of the periodic pulses.

7. A time delay circuit for providing a selected time delay comprising:

a first input terminal for application of a control signal;

a R-C time constant circuit including a capacitive impedance and a resistive impedance serially connected between a source of biasing potential and a source of reference potential and defining a circuit point therebetween;

first diode means connecting said first input terminal to said circuit point, the control signal having an amplitude variable between a first potential for charging said R-C circuit and a second potential for triggering said time delay circuit, said first potential forward biasing and said second potential back-biasing said first diode means;

a second input terminal for application of a pulse train of interrogation signals;

a resistor, having a resistance in excess of 10 ohms, coupled to said circuit point;

a second diode means coupled between said resistor and said second input terminal and poled in series opposing with said first diode means;

an output terminal;

a coupling capacitor of substantially smaller impedance than the capacitive impedance in said R-C network coupled to said second diode means;

a third diode means, poled in series aiding with said second diode means, coupling said coupling capacitor to said output terminal; and means for varying the amplitude of said control signal from said first to said second potential whereby said R-C circuit commences discharging to lower the back-bias on said second diode means to allow conduction of said interrogation signals therethrough after said selected time delay.

8. A time delay circuit for providing an output signal a selected time interval subsequent to the occurrence of a control signal comprising:

R-C time constant network means;

charging means for normally maintaining said network means at a first potential, said charging means being responsive to said control signal and operative to effectively isolate itself from said network means to thereby allow said network means to discharge to a second potential in accordance with its time constant;

source means for providing a train of interrogation pulses, the pulse amplitude of the interrogation pulses being selected to correspond to the potential of the said network means after discharging for a period equal to said selected time interval;

diode means connected to said source means;

resistor means, having a resistance of at least 10 ohms, connected between said diode means and said network means; and output means coupled to the junction between said diode means and said resistor means to provide said output signal in response to the conduction of an interrogation pulse through said diode means.

9. A time delay network for providing a selected time delay comprising:

R-C time constant circuit means having a predetermined time constant for providing a changing potential, said circuit means being responsive to a control signal and operative to change its potential from a first potential to a second potential in accordance with its time constant;

pulse means for providing a train of pulses;

a resistor means, having a resistance of not less than 10 ohms, connected to said circuit means; and voltage controlled gating means for the reception of said train of pulses connected to said resistor means, said gating means being responsive to the changing potential of said circuit means and operative to block pulse conduction when said changing potential is at said first potential and to conduct pulses when said changing potential drops below the potential amplitude of said pulses, the potential amplitude of said pulses being selected to be equal to the changing potential of said circuit means after a period equal to said selected time delay subsequent to the reception of said control signal.

References Cited

UNITED STATES PATENTS 2,838,689 6/1958 Clapper ----------- 307—88.5

ARTHUR GAUSS, *Primary Examiner.*

GEORGE WESTBY, *Examiner.*

J. BUSCH, S. MILLER, *Assistant Examiners.*